United States Patent [19]

Altounian

[11] Patent Number: 4,525,574
[45] Date of Patent: Jun. 25, 1985

[54] POLYESTERS POLYOLS PREPARED FROM GLUTARIC ACID, SUCCINIC ACID AND ADIPIC ACID, AND POLYURETHANES PREPARED THEREFROM

[75] Inventor: George N. Altounian, Cap Rouge, Canada

[73] Assignee: Centre de Recherche Industrielle de Quebec, Pointe-Claire, Canada

[21] Appl. No.: 517,397

[22] Filed: Jul. 26, 1983

[30] Foreign Application Priority Data

Feb. 11, 1983 [CA] Canada .................................. 427364

[51] Int. Cl.$^3$ .............................................. C08G 63/22
[52] U.S. Cl. .................................... 528/283; 528/302
[58] Field of Search ................................ 528/283, 302

[56] References Cited

U.S. PATENT DOCUMENTS

| 3,888,908 | 6/1975 | Cross et al. | 528/308 |
| 4,018,815 | 4/1977 | Vogt et al. | 528/308 |
| 4,096,129 | 6/1978 | Cook | 252/182 |
| 4,363,853 | 12/1982 | Imamura et al. | 428/349 |

FOREIGN PATENT DOCUMENTS

| 833590 | 2/1970 | Canada . |
| 0004617A1 | 10/1979 | European Pat. Off. . |
| 0044969A1 | 2/1982 | European Pat. Off. . |
| 882603 | 11/1961 | United Kingdom . |
| 1475541 | 6/1977 | United Kingdom . |
| 2021602A | 12/1979 | United Kingdom . |

Primary Examiner—Maurice J. Welsh
Attorney, Agent, or Firm—Schwartz, Jeffery, Schwaab, Mack, Blumenthal & Evans

[57] ABSTRACT

Preparation of new polyols from mixtures of dicarboxylic acids comprising glutaric acid, succinic acid and adipic acid and polyhydric alcohols, such as mixtures of acids which are derived from treated residues resulting from the industrial production of adipic acid. Preparation of new polyurethanes from these polyols by reacting the latter with polyisocyanates. Obtaining products possessing advantageous properties and interesting market for treated residues resulting from the industrial production of adipic acid.

1 Claim, No Drawings

POLYESTERS POLYOLS PREPARED FROM GLUTARIC ACID, SUCCINIC ACID AND ADIPIC ACID, AND POLYURETHANES PREPARED THEREFROM

BACKGROUND OF THE INVENTION (a) Field of the Invention

The present invention relates to new polyols and a process of preparing the same, as well as new urethane elastomers and foams which result from the new polyols. The invention also relates to a process for the preparation of these urethanes. More specifically, the invention is directed to new rigid polyurethane elastomers having a minimum Shore D hardness of 60.

(b) Description of the Prior Art

It is well known to prepare polyols by reacting polycarboxylic acids, their anhydrides or esters (transesterification or polycondensation) with polyhydric alcohols in the presence of a catalyst selected from stannus and stannic chlorides and alkyl-tin compounds. In general, these reactions are carried out at temperatures between about 130° C. and 240° C. for a reaction time which is of the order of 12 to 16 hours.

The reactants used for carrying out this known process include polycarboxylic acids, the anhydrides as well as the esters thereof, and polyhydric alcohols. Among the polycarboxylic acids used, the following are mentioned by way of example: oxalic, malonic, succinic, glutaric, adipic, pimelic, suberic, azelaic, sebacic, brassidic, thapsic, maleic, fumaric, glutaconic, alpha-hydromuconic, beta-hydromuconic, alpha-butyl, alpha-ethylglutaric, alpha-beta-diethyl succinic, isophthalic, terephthalic, hemimellitic and 1,4-cyclohexanedicarboxylic acids.

Among the polyhydric alcohols, a suitable alphatic or aromatic alcohol can be used. By way of example, the following polyalcohols are mentioned:
ethylene glycol, diethylene glycol, triethylene glycol,
tetraethylene glycol, propylene glycol, dipropylene glycol, trimethylene glycol, 1,2-propylene glycol,
1,4-tetramethylene glycol, butylene glycol, 1,2-butylene glycol,
1,4-butane diol, 1,3-butane diol, 1,5-pentane diol,
1,4-pentane diol, 1,3-pentane diol, 1,6-hexane diol,
1,7-heptane diol, glycerol, 1,1,1-trimethylol propane,
1,1,1-trimethylolethane, hexane-1,2,6-triol, neopentylglycol, dibromoneopentylglycol, 1,10-decanediol,
2,2-bis(4-hydroxycyclohexyl)propane, triethylolethane, triethanolamine and pentaerythritol.

This process particularly brings out the use of two steps during the reaction of the acid or the dibasic ester thereof with various polyfonctional alcohols. In the first step, the acid or the dibasic ester reacts with alcohols in which the "hydroxyl" function is only slightly available, such as secondary or tertiary alcohols or primary alcohols which are highly cluttered. Then, more reactive alcohols such as primary alcohols are added to the reaction mixture.

One of the problems encountered during the preparation of ester polyols is the release of water during the polycondensation of dibasic acid with the alcohol:

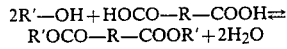

(POLYCONDENSATION)

or the release of methanol during the transesterification of the dibasic ester with the alcohols:

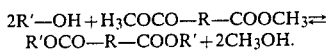

The polycondensation and the transesterification are equilibrium reactions. In order to promote the formation of ester polyols, it is necessary to eliminate the water or methanol formed, by distillation, if it is intended to obtain a complete reaction. It is to be noted that the quantity of water or methanol which is released enables to follow the evolution of the reaction which takes place.

In the prior art, for example, Canadian Pat. No. 833,590 describes the preparation of a polyester polyol by reaction of a polyol with an ester of a dicarboxylic acid (adipic acid) in the presence of a catalyst which is the product of the reaction between dialkyl tin oxide and a titanium compound. Example 3 describes the preparation of polyol catalysed by dibutyl tin oxide and 2-ethyl hexyl titanate. On the other hand, Canadian Pat. No. 1,035,895 (which corresponds to U.S. Pat. No. 3,888,908) describes polyester polyols prepared from a dicarboxylic acid, the anhydride of a carboxylic acid, a dialcohol and a trialcohol.

Canadian Pat. No. 1,059,529 (which corresponds to U.S. Pat. No. 4,018,815) discloses the preparation of a polyester polyol by esterification of a polycarboxylic acid with a polyalcohol wherein the alcohol is added in two stages. The acid can be adipic acid and the alcohol can be ethylene glycol, diethylene glycol, 1,4-butane diol and mixtures thereof. A conventional catalyst can be added during the last stage of the process.

Canadian Pat. No. 1,093,571 (which corresponds to U.S. Pat. No. 4,096,129) relates to polyester polyols prepared from glutaric acid esters and adipic acid.

Finally, the following patents are not considered pertinent and are only mentioned as of interest:

| | |
|---|---|
| Canadian Patent | 595,272 |
| Canadian Patent | 677,430 |
| Canadian Patent | 847,334 |
| Canadian Patent | 927,042 |
| Canadian Patent | 1,035,895 |
| Canadian Patent | 1,070,450 |
| Canadian Patent | 1,095,534 |
| U.S. Pat. No. | 3,647,759 |
| U.S. Pat. No. | 4,237,238 |

On the other hand, it is known that there are easily accessible mixtures of dicarboxylic acids which, in practice, have not been found commercially attractive. For example, those containing glutaric acid, succinic acid and adipic acid may be mentioned. For example, an interesting byproduct is the mixture of dicarboxylic acids, esters or anhydrides, which is obtained from treated residues resulting from the industrial production of adipic acid. This mixture usually comprises about 50 to 70% by weight of glutaric acid, about 15 to 30% by weight of succinic acid and about 10 to 20% by weight of adipic acid, or esters or anhydrides of these acids.

It has been found that it would be advantageous to use as starting products, such mixtures of dicarboxylic acids and particularly those which are obtained from treated residues resulting from the production of adipic acid. It has been found that by using these mixtures of acids in a process for the preparation of polyols, there are obtained products which are characterized by a hydroxyl number lower than 600, an acid value lower than 3 and a hydroxyl functionality which is at least equal to 2.0.

With respect to the urethanes which can be obtained from the polyols according to the present invention, they are particularly interesting, for example in the form of elastomers possessing a minimum Shore D hardness of 60. As a foam, they have a density of about 1000 to 21 kg/m$^3$, of which the dimensional stability in percentage of mass expansion is between 0.05 and 0.20% at 72° C., and 96.5% humidity after one week, for those foams having a density of about 32 to 21 kg/m$^3$.

SUMMARY OF THE INVENTION

Broadly, the invention concerns a process for the preparation of polyols, which comprises reacting a mixture of dicarboxylic acids comprising glutaric acid, succinic acid and adipic acid, their esters or anhydrides with at least one polyhydric alcohol so as to obtain polyols.

For example, a mixture of acids which may be used comprises about 50 to 70% by weight of glutaric acid, about 15 to 30% by weight of succinic acid and about 10 to 20% by weight of adipic acid, or esters or anhydrides of these acids. Preferably, a mixture of acids is obtained from treated residues resulting from the industrial production of adipic acid. These mixtures are known commercially under the terms DBA (dibasic acids) and DBE (dibasic esters).

The reaction is usually carried out in the presence of a catalyst, such as one selected from stannic and stannous chlorides and alkyl-tin compounds.

Although the temperature and the reaction time are not critical, it is preferred to carry out the reaction at temperatures between about 130° C. and 240° C., and to adjust the reaction time to between 2 and 16 hours.

The preferred dihydric alcohols which are used for the preparation of the polyols according to the invention include ethylene glycol, propylene glycol, butylene glycol, dipropylene glycol, diethylene glycol, neopentyl glycol, hexane diol, etc.

Preferred trihydric alcohols are selected from triethylolethane, trimethylolpropane triethanolamine and glycerol. The preferred tetrahydric alcohol is pentaerythritol.

Preferably, the reaction of the mixture of acids, esters or anhydrides is carried out in a first step with at least one polyhydroxy alcohol wherein the hydroxy function is not very easily available, followed by a second step where there is added at least one polyhydroxy alcohol wherein the hydroxy function is more available. For example, in the first step, one may use at least one polyhydroxy alcohol selected from the group consisting of secondary and tertiary alcohols and highly cluttered primary alcohols, and in the second step, less cluttered alcohols are added.

According to a preferred embodiment of the invention, the preparation of the polyols involves the following steps:

(a) Introducing in a reactor a mixture of acids comprising about 50 to 70% by weight of glutaric acid, about 15 to 30% by weight of succinic acid and about 10 to 20% by weight of adipic acid, or esters or anhydrides of these acids, with at least one polyhydroxy alcohol selected from the group consisting of secondary alcohols, tertiary alcohols and highly cluttered primary alcohols, with a catalyst selected from the group consisting of stannous and stannic chlorides and alkyl-tin compounds.

(b) The reaction mixture is flushed with an inert gas.

(c) The reaction mixture is heated while stirring at a temperature which does not exceed about 225° C.

(d) Removing 90 to 95% of the water or methanol formed in step (c).

(e) Introducing into the reactor at least one slightly cluttered primary alcohol.

(f) Heating at about 225° C. and removing the maximum amount of water or methanol by distillation.

(g) Ending the reaction by creating a vacuum in the reactor in order to remove all traces of water or methanol in the reaction mixture and continuing this operation until the polyol obtained has an acid value lower than 3, a hydroxyl functionality at least equal to 2.0 and a hydroxyl number lower than 600.

According to a preferred embodiment of the invention, the polyhydroxy alcohols are selected from the group consisting of dihydric, trihydric and tetrahydric alcohols, the molar ratio between the dihydric alcohol and the trihydric alcohol being 1 to 2:1, the molar ratio between the dihydric alcohol and the tetrahydric alcohol being from 3 to 5:1.

Mixtures of acids can be used alone or in combination with at least one other dicarboxylic acid or its anhydride, such as phthalic acid or the like.

Another aspect of the invention concerns new polyols obtained by polycondensation and transesterification of a mixture comprising glutaric acid (about 50 to 70% by weight), succinic acid (about 15 to 30% by weight), and adipic acid (about 10 to 20% by weight), their anhydrides or lower alkyl (1–5C) esters thereof, having a molecular weight between 130 and 160, and dihydric, trihydric and tetrahydric alcohols, the molar ratio between the dihydric alcohol and trihydric alcohol being 1 to 2:1, the molar ratio between the dihydric alcohol and tetrahydric alcohol being from 3 to 5:1.

These polyols are characterized by a hydroxyl number lower than 600, an acid value lower than 3 and a hydroxyl functionality equal to or higher than 2.0.

Another aspect of the present invention comprises the preparation of new polyurethanes, preferably in the form of elastomers and foams from the new polyols described above, as well as the elastomers and foams produced by this process, and more particularly the preparation of new polyurethanes in the form of rigid elastomers having a minimum Shore D hardness of 60.

It is well recognized that the durability, the hardness and the resistance to bad weather of urethanes prepared from polyester polyols are dependent on the percentage of crosslinking of the urethane which is the function of the molecular structure of the polyester polyols.

It is well known that the preparation of cross-linked polyurethanes can be carried out from polyols having a high functionality. For example, a higher rigidity can be obtained by using polyols having a functionality higher than 2. In the preparation of rigid foams of urethane as well as rigid elastomers of the same polymer having a minimum hardness of 60 (Shore D), the use of polyols having a functionality of at least 3 must be contemplated.

It has been realized that the polyester polyols of the present invention will be used for preparing polyurethanes in the form of foams or elastomers and particularly rigid elastomers of a Shore D hardness between 60 and 95 and preferably between 80 and 95.

These polyurethanes can be obtained by reacting the polyester polyols of the present invention with aliphatic or aromatic polyisocyanates. Among the aliphatic polyisocyanates, examples include saturated cyclic diisocyanates such as isophorone diisocyanate. Examples of aromatic polyisocyanates include phenylene-1,3 and 1,4-diisocyanate, diphenylmethane-4,4'-diisocyanate, triphenylmethane-4,4',4''-triisocyanate, polyphenylpolymethylene-polyisocyanate, etc.

In the preparation of the polyurethanes according to the present invention, the polyisocyanates and the new polyester polyols are present in the proportions respectively between 0.5 to 4:1 by weight.

The reaction between the polyisocyanates and the new polyols can be carried out by any known methods, such as those used in the processes generally known under the names "Hot Cast" and "Fast Cast" for elastomers and "Spray Foam", "Moulding Foam" and "Froth Foam" for foams.

In the preparation of the polyurethanes according to the present invention, it is sometimes necessary to control the degree of rigidity of the polyurethanes. For this purpose, there is generally used in combination with the new polyester polyol, a minor quantity of a crosslinking agent of low functionality such as a polyether polyol, e.g. dipropylene ether glycol, or a polyhydroxy amine, e.g. triethanolamine.

The reaction can also involve conventional additives used in the preparation of polyurethanes.
Examples include:
plasticizers such as dioctyl phthalate, benzoyl butyl phthalate, etc;
catalysts such as tin salts (such as dibutyl tin diacetate, stannous acrylate, etc.);
fire-proofing agents such as trihydrated aluminum, trichloroethyl phosphate, diammonium phosphate, antimony dioxide, etc;
surface active agents, such as silicone oils, silicone-glycol copolymers, etc.;
dehydrating agents, such as toluene monoisocyanate, aluminum oxides, calcium chloride, etc.

Moreover, in the preparation of foams according to the present invention, foaming agents will also be used, such as air, inert gases, water, FREON*, methylene chloride, etc., or preferably a mixture of water, FREON* and methylene chloride. In the preparation of elastomers of the present invention, fillers may be used such as calcium carbonate, fiberglass, mica, wollastonite, etc.
*Trade Mark The invention will now be illustrated by means of the following examples which are not intended to be limiting.

EXAMPLE 1

The reactor comprises a 5000 ml flask provided with three tubular inlets and a supply of nitrogen, a mechanical stirrer, a distillation column, a water trap and a water cooler. Introduce 1000 g (6.32 moles) of dibasic ester (DBE), 466 g (3.47 moles) of dipropylene glycol, 172 g (1.26 mole) of pentaerythritol, 1.2 g dibutyl tin oxide and 0.4 g 2-ethylhexyltitanate. The dibasic ester (DBE) comprises 27% by weight of succinic acid dimethylester, 59% by weight of glutaric acid dimethylester and 14% by weight of adipic acid dimethylester. The reaction mixture is kept under inert atmosphere (nitrogen), stirred and heated. At about 170° C., methanol starts to distillate. Continue heating until the temperature reaches 200° C. When about 90-95% of the methanol has been distilled, i.e. 135-145 g (170-180 ml), introduce in the following order: 327 g (3.16 moles) of neopentyl glycol, 339 g (2.53 moles) of trimethylolpropane and 330 g (2.21 moles) of triethanolamine. Continue heating in order to remove as much methanol as possible and, when the distillation has stopped, place the reactor under vacuum to remove the last traces of methanol and to finalize the reaction. Cool the reactor down to 100° C. before removing the vacuum conditions and transfer the polyester polyol (2,232 g) obtained.

This ester has a functionality of 3.15, a hydroxyl number of 501 (calculated=500) and an acid value of 1.0.

EXAMPLE 2

The reactor comprises a flask with 3 tubular inlets, a supply of nitrogen, a mechanical stirrer, a distillation column, a water trap and a water cooler. Introduce into the reactor 9.8 parts by weight of maleic anhydride, 14.8 parts by weight of phthalic anhydride, 105.0 parts by weight of dibasic acid (DBA) and 134.2 parts by weight of propylene glycol. The dibasic acid is composed of 18% by weight of succinic acid, 70% by weight of glutaric acid and 12% by weight adipic acid. Keep the reaction mixture under inert atmosphere (nitrogen), stir and start heating. At 100° C., add to the solution 0.4 parts of 2-ethylhexyltitanate. At about 170° C., water starts to distillate. Continue heating until the temperature reaches 200° C. When about 90% of the water has been distilled off, i.e. 16.2 parts by weight, introduce into the reactor, 134.2 parts by weight of trimethylolpropane. Continue heating in order to remove as much water as possible and when the distillation has stopped, place the reactor under vacuum to thereby remove the last traces of water and end the reaction. Cool the reactor down to 100° C. before removing the vacuum conditions and transfer the polyester polyol obtained.

This ester has a functionality of 3.0, a hydroxyl number of 420 and an acid value of 1.6.

EXAMPLE 3

Example 2 is repeated using 158.35 g of DBE, 100.64 g of dipropylene glycol, 140.89 g of trimethylolpropane, 29.84 g of triethanolamine, 0.18 g of dibutyl tin oxide, 0.07 g of 2-ethyl hexyltitanate and 0.01 g of an anti-foaming agent (Dow Corning anti-foam).

There is obtained a polyester polyol having a functionality of 3.25, a hydroxyl number of 492 and an acid value of 1.95.

EXAMPLE 4

Example 2 is repeated, using 158.35 g of DBE, 236.18 g of 1,6-hexanediol; there is obtained a polyester polyol having a functionality of 2.0, a hydroxyl number of 334 and an acid value of 0.1.

EXAMPLE 5

Example 2 is repeated, using 243.49 g of DBE, 200 g of polyethylene glycol, 134.18 g of trimethylolpropane. There is obtained 339.44 g of a polyester polyol having a functionality of 3.0, a hydroxyl number of 368 and an acid value of 0.24.

EXAMPLE 6

Example 2 is repeated, using 126.7 g of DBE, 38.9 g of dimethyl terephthalate, 134.2 g of trimethylolpropane and 118.2 g of 1,6-hexanediol. There are obtained 353.8 g of a polyester polyol having a functionality of 3.0, a hydroxyl number of 488 and an acid value of 1.6.

EXAMPLE 7

Preparation of a polyurethane foam.

The polyester glycol starting product is the one obtained by the process according to Example 2, according to the following formulation:

| Reactants | —OH mole | Quantity of mole | g/mole |
| --- | --- | --- | --- |
| Dibasic ester (DBE) | −2.00 | 1.00 | 158.35 |
| Dipropylene glycol | 1.10 | 0.55 | 72.80 |
| Pentaerythritol | 0.80 | 0.20 | 27.23 |
| Trimethylolpropane | 1.20 | 0.40 | 53.67 |
| Neopentyl glycol | 1.00 | 0.50 | 52.08 |
| Triethanolamine | 1.05 | 0.35 | 52.22 |
| C/F | 3.15 | | 416.35 |

| Reactants | —OH mole | Quantity of mole | g/ g/mole |
| --- | --- | --- | --- |
| B/f | 3.15 | — | 416.35 |
| 2-ethyl hexyltitanate | — | — | 0.07 |
| Dibutyltinoxide | — | — | 0.19 |
| D.C. antifoam A** (Dow Corning) | — | — | 0.006 |
| Methanol loss | — | −2.00 | −64.08 |
| | 3.15 | | 352.536 |

**Trade Mark (Dow Corning) this is a high molecular weight silicone used as antifoaming agent.

This polyol has an acid value of less than 3 and a hydroxyl number of 500. The polyol polymerized between 120° C. and 205° C.

The polyurethane foam is prepared from the polyester polyol obtained above, and a polyisocyanate, in a conventional manner according to the following formulation:

| | % by weight |
| --- | --- |
| Component B | |
| Polyester polyol | 73 |
| Silicone | 0.75 |
| Tertiary amine | 0.75 |
| Water | 0.5 |
| FREON* II (fluoro chloroethane) | 25 |
| | 100% |
| Component A | |
| Polymethylene polyisocyanate | 104.6 parts/100 parts of Component B. |

*Trade Mark

This foam has a density of 31.1 kg/m³

EXAMPLE 8

A polyurethane foam is prepared by the method described in Example 7, using the polyol prepared according to Example 3. There is obtained a foam of a density of 26.6 kg/m³.

EXAMPLE 9

A polyurethane foam is prepared by the method as described in Example 7, using the polyol prepared according to Example 4. There is obtained a foam of a density of 33.9 kg/m³.

EXAMPLE 10

A polyurethane foam is prepared by the method as described in Example 7, using the polyol prepared according to Example 5. There is obtained a foam of a density of 23.7 kg/m³.

EXAMPLE 11

A polyurethane foam is prepared by the method as described in Example 7, using the polyol prepared according to Example 2. There is obtained a foam of a density of 83.4 kg/m³.

EXAMPLE 12

A polyurethane foam is prepared by the method as described in Example 7, using the polyol prepared according to Example 6. There is obtained a foam of a density of 25.3 kg/m³.

EXAMPLE 13

A rigid polyurethane elastomer is prepared using the polyol prepared according to Example 7. The polyurethane is prepared in a conventional manner according to the following formulation:

| | % by weight |
| --- | --- |
| Component B | |
| Polyester polyol | 59.8 |
| Polypropylene ether glycol | 19.9 |
| Dioctyl phthalate | 19.9 |
| Tin salt | 0.05 |
| Silicone | 0.35 |
| | 100.00 |
| Component A | |
| Polymethylene polyisocyanate | 86.48 parts/100 parts of component B |

The polyurethane elastomer obtained has a Shore D hardness of 87.

EXAMPLE 14

A rigid polyurethane elastomer is prepared using the polyol prepared according to Example 7. The polyurethane is prepared in a conventional manner according to the following formulation:

| | % by weight |
| --- | --- |
| Component B | |
| Polyester polyol (Example 7) | 99.6 |
| Tin salt | 0.05 |
| Silicone | 0.35 |
| | 100.00 |
| Component A | |
| Polymethylene polyisocyanate | 119 parts/100 parts of Component B. |

The polyurethane elastomer obtained has a Shore D hardness of 92.

EXAMPLE 15

A rigid polyurethane foam is prepared using the polyol prepared according to Example 7.

The polyurethane is prepared by agitating vigorously Components A and B.

| Component B | |
|---|---|
| Polyester polyol (Example 7) | 100 parts by weight. |
| Component A | |
| Polymethylene polyisocyanate | 135 parts by weight/100 parts by weight of Component B. |

The polyurethane foam obtained has a density of 487 kg/m³.

EXAMPLE 16

A rigid polyurethane foam is prepared using the polyol prepared according to example 7. The polyurethane is prepared by agitating vigourously components A and B.

| Component B | |
|---|---|
| Polyester polyol (example 7) | 100 parts by weight |
| Freon II* | 2 parts by weight |
| | 102 |
| Component A | |
| Polymethylene polyisocyanate | 135 parts by weight 102 parts of component B |

*Trademark "Dupont of Nemours (Fluorochloroethane)

The rigid polyurethane foam obtained has a density of 155 kg/m³

I claim:

1. Process for preparing polyols which comprises
   (a) introducing in a reactor a mixture of acids comprising about 50 to 70% by weight of glutaric acid, about 15 to 30% by weight of succinic acid and about 10 to 20% by weight of adipic acid, or esters or anhydrides thereof, with at least one polyhydroxy alcohol selected from the group consisting of secondary alcohols, tertiary alcohols, and highly cluttered alcohols, with a catalyst selected from the group consisting of stannous chloride, stannic chloride and alkyl-tin compounds;
   (b) flushing the reaction mixture with an inert gas;
   (c) heating the reaction mixture while stirring at a temperature not exceeding about 225° C.;
   (d) removing 90 to 95% of the water or methanol formed during step (c);
   (e) introducing into the reactor at least one primary alcohol which is not cluttered;
   (f) heating to about 225° C. and removing by distillation the maximum of water or methanol;
   (g) ending the reaction by placing the reactor under vacuum in order to remove all traces of water or methanol in the reaction mixture and continuing this operation until the polyol obtained has an acid value lower than 3, a hydroxyl functionality at least equal to 2.0 and a hydroxyl number lower than 600.

* * * * *